(12) United States Patent
Foser et al.

(10) Patent No.: US 10,702,910 B2
(45) Date of Patent: Jul. 7, 2020

(54) METHOD FOR THE PRODUCTION OF A STRIP FOR FASTENING ELEMENTS

(71) Applicant: Hilti Aktiengesellschaft, Schaan (LI)

(72) Inventors: Thomas Foser, Balzers (LI); Ho-Tien Chen, Tainan (TW)

(73) Assignee: HILTI AKTIENGESELLSCHAFT, Schaan (LI)

( * ) Notice: Subject to any disclaimer, the term of this patent is extended or adjusted under 35 U.S.C. 154(b) by 1295 days.

(21) Appl. No.: 14/405,481

(22) PCT Filed: May 22, 2013

(86) PCT No.: PCT/EP2013/060456
§ 371 (c)(1),
(2) Date: Mar. 3, 2015

(87) PCT Pub. No.: WO2013/182420
PCT Pub. Date: Dec. 12, 2013

(65) Prior Publication Data
US 2015/0174640 A1    Jun. 25, 2015

(30) Foreign Application Priority Data
Jun. 4, 2012   (DE) ........................ 10 2012 209 402

(51) Int. Cl.
*B21D 22/20* (2006.01)
*B21D 53/14* (2006.01)
(Continued)

(52) U.S. Cl.
CPC ........... *B21D 53/14* (2013.01); *B21D 22/203* (2013.01); *B21D 22/206* (2013.01); *B25C 1/00* (2013.01);
(Continued)

(58) Field of Classification Search
CPC .... B21D 53/14; B21D 22/203; B21D 22/206; B25C 1/00; Y10T 29/49876; Y10T 29/49826; Y10T 29/49837; F16B 15/08
See application file for complete search history.

(56) References Cited

U.S. PATENT DOCUMENTS 3,342,659 A     9/1967 Baum et al.
3,841,472 A  * 10/1974 Fuller .................... B65D 73/02
                                                     198/803.8
(Continued)

FOREIGN PATENT DOCUMENTS

CN          1250137 A     4/2000
CN          2573745 Y     9/2003
(Continued)

OTHER PUBLICATIONS

International Search Report, Application No. PCT/EP2013/060456 dated Dec. 9, 2013.

*Primary Examiner* — Sarang Afzali
*Assistant Examiner* — Ruth G Hidalgo-Hernandez
(74) *Attorney, Agent, or Firm* — Leydig Voit & Mayer, Ltd.

(57) ABSTRACT

Disclosed is a method for producing a strip for fastening elements, said strip comprising a plurality of interconnected holders, each of which accommodates a shaft of a fastening element. The holders define a fastening direction in which the fastening element can be driven from the holder into a support by a fastening device. The disclosed method comprises the following steps: a) producing a continuous strip defining a longitudinal direction of the strip; b) making the holders from the strip material by means of a deep-drawing process; c) accommodating the fastening elements in the holders.

13 Claims, 7 Drawing Sheets

Figure 1:
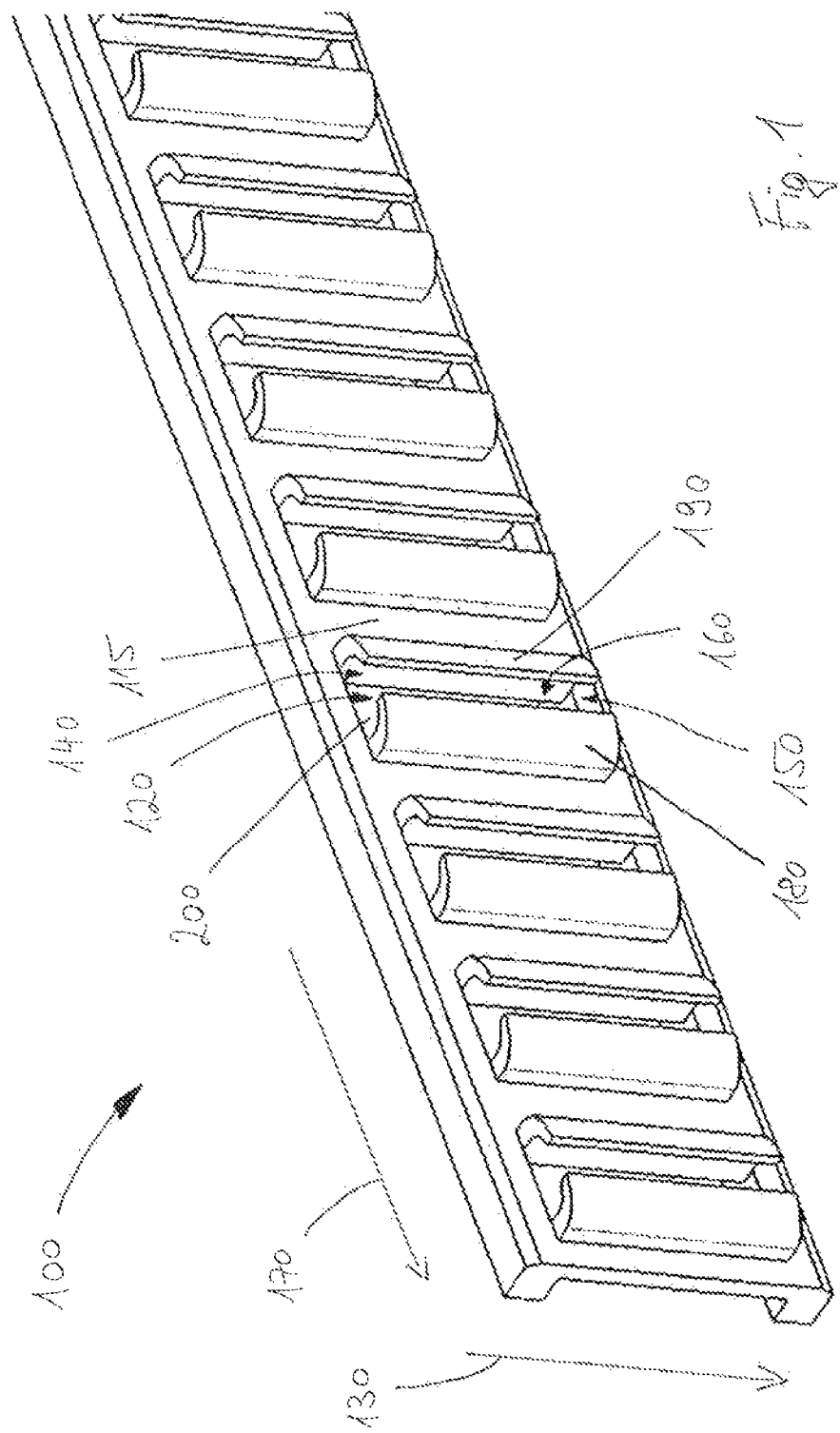

(51) Int. Cl.
*B25C 1/00* (2006.01)
*F16B 15/08* (2006.01)

(52) U.S. Cl.
CPC ......... *F16B 15/08* (2013.01); *Y10T 29/49826* (2015.01); *Y10T 29/49837* (2015.01); *Y10T 29/49876* (2015.01)

(56) References Cited

U.S. PATENT DOCUMENTS

| | | | | |
|---|---|---|---|---|
| 3,885,669 | A | * | 5/1975 | Potucek ................. F16B 27/00 206/338 |
| 4,915,223 | A | | 4/1990 | Fischer |
| 5,791,186 | A | * | 8/1998 | Nishida ................. B21D 22/02 72/337 |
| 8,479,550 | B2 | | 7/2013 | Eckerstorfer et al. |
| 8,721,244 | B2 | | 5/2014 | Nakagawa et al. |

FOREIGN PATENT DOCUMENTS

| | | |
|---|---|---|
| CN | 201382060 Y | 1/2010 |
| DE | 22 16 022 A1 | 10/1973 |
| DE | 39 26 739 A1 | 2/1991 |
| DE | 10 2012 209 402 A1 | 12/2013 |
| EP | 0 331 874 A1 | 9/1989 |
| JP | S53124729 A | 10/1978 |
| JP | H01216111 A | 8/1989 |
| JP | 2009-514684 A | 4/2009 |
| JP | 2009-115212 A | 5/2009 |
| WO | WO 03/082546 A1 | 10/2003 |

* cited by examiner

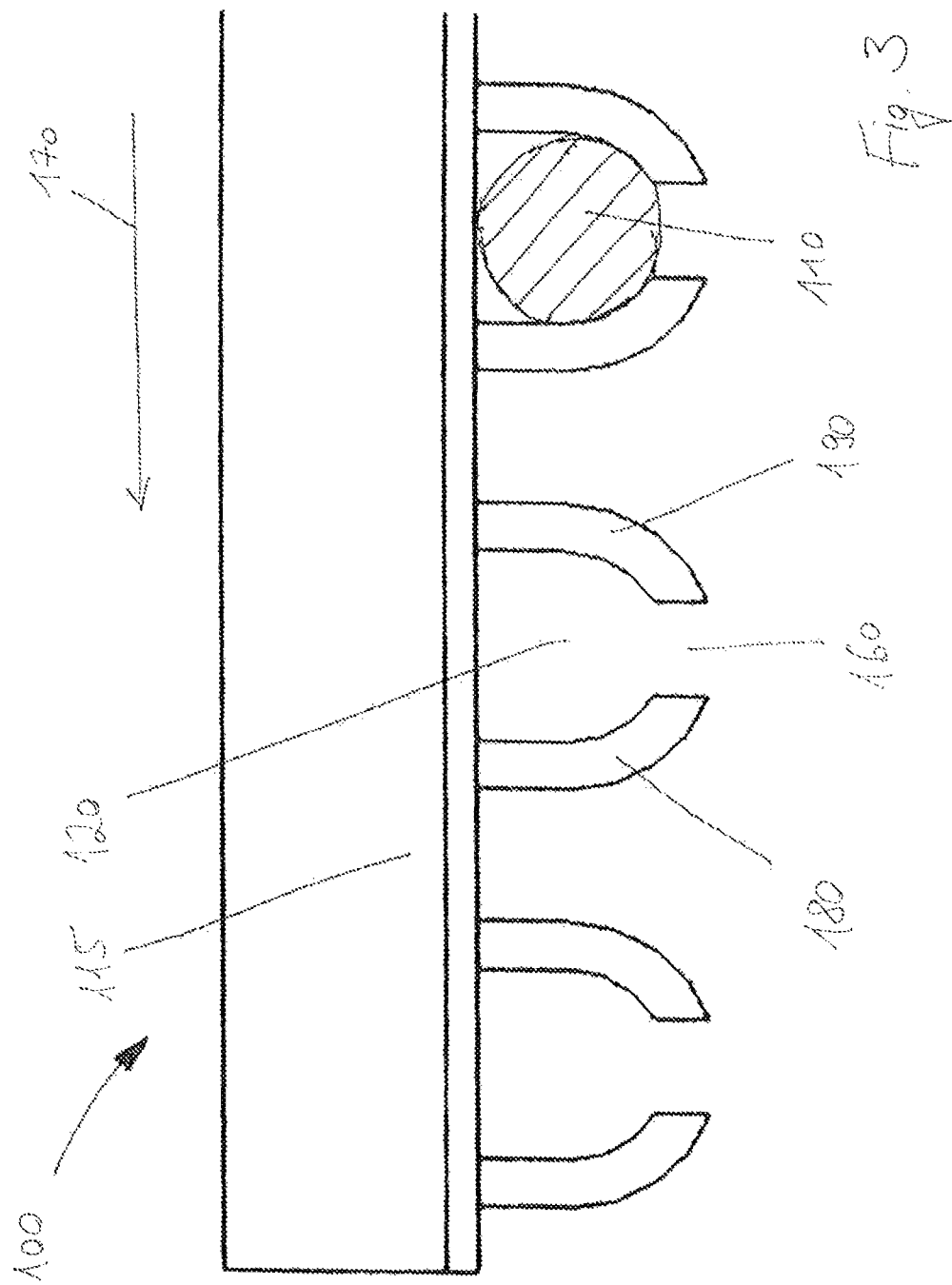

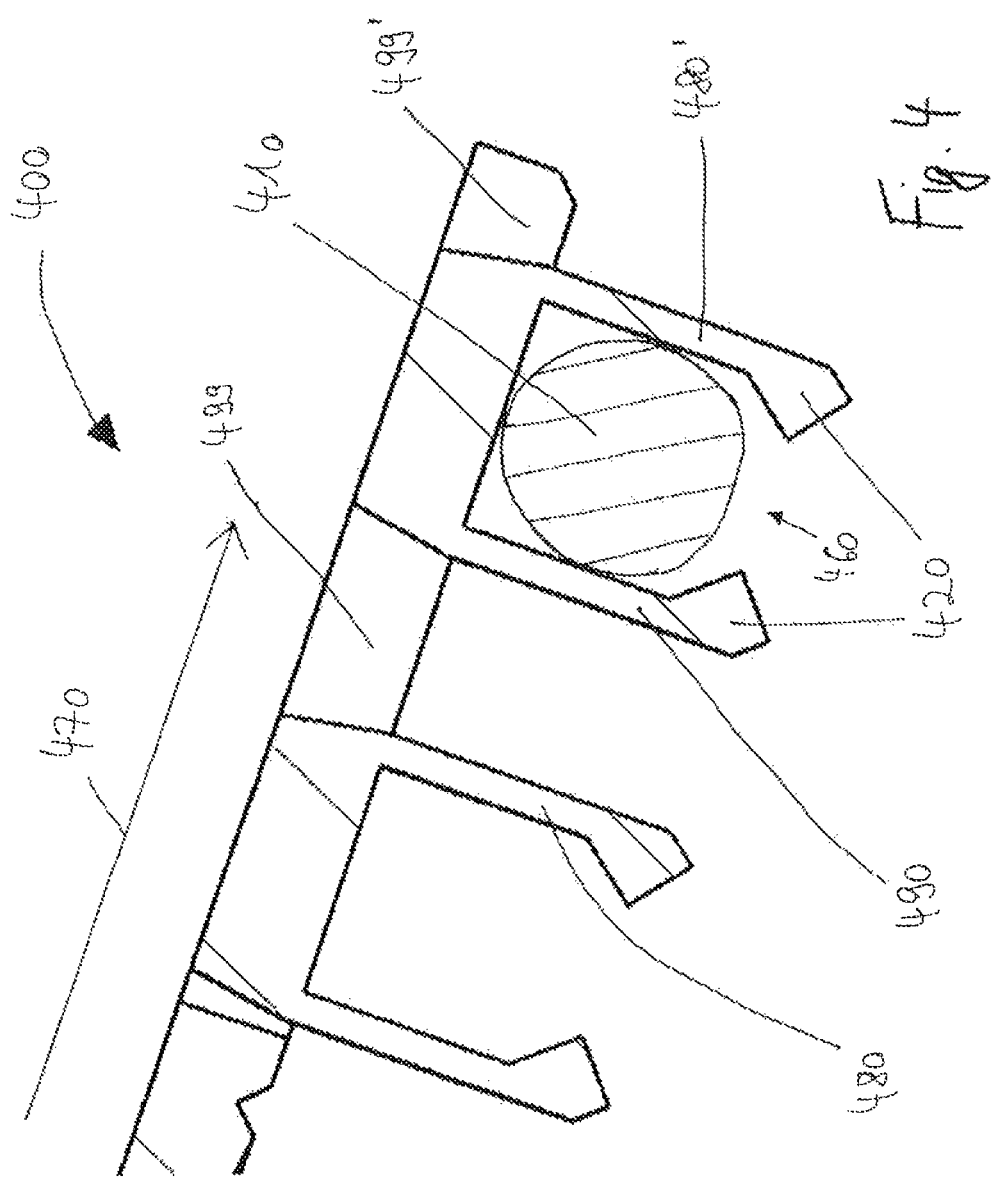

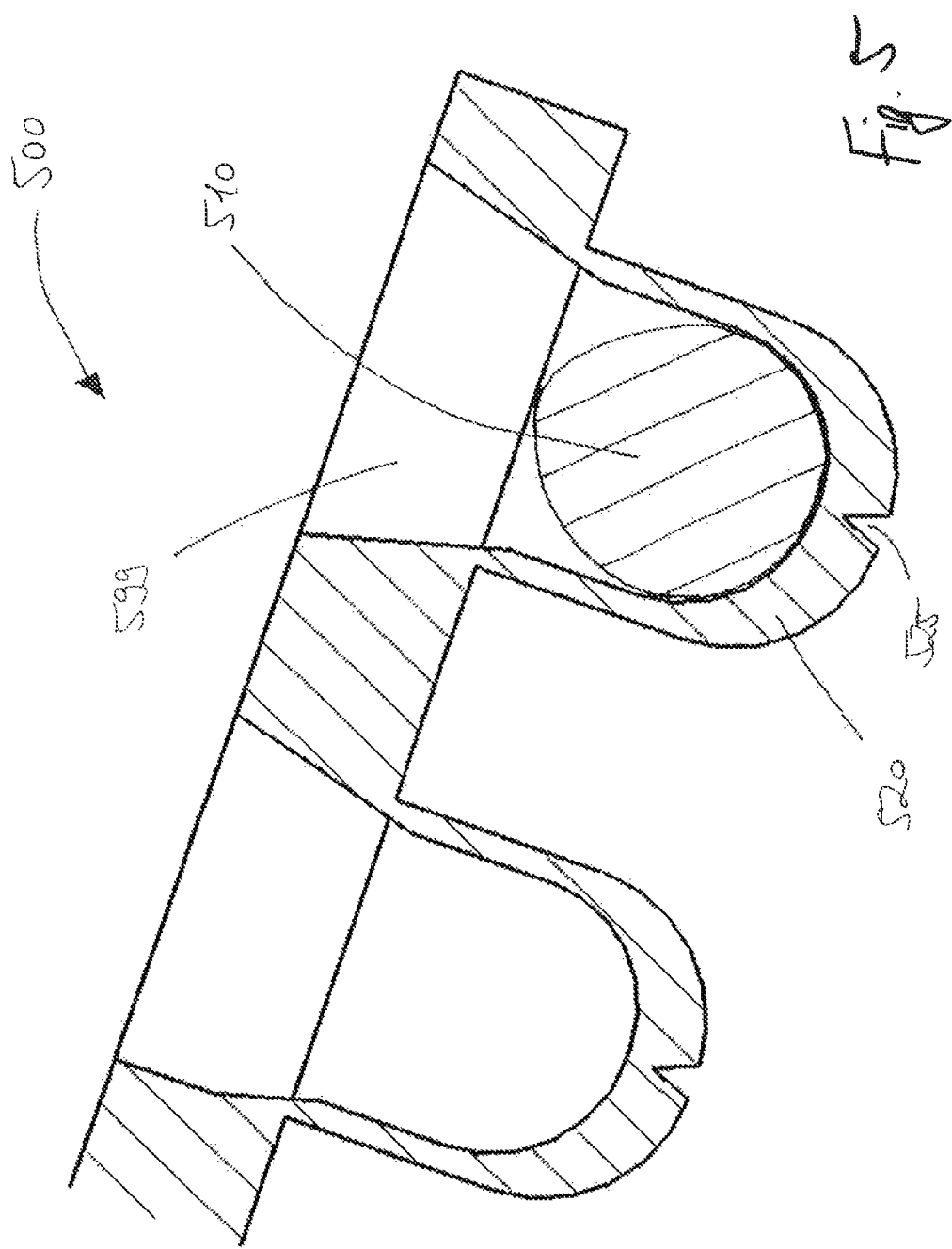

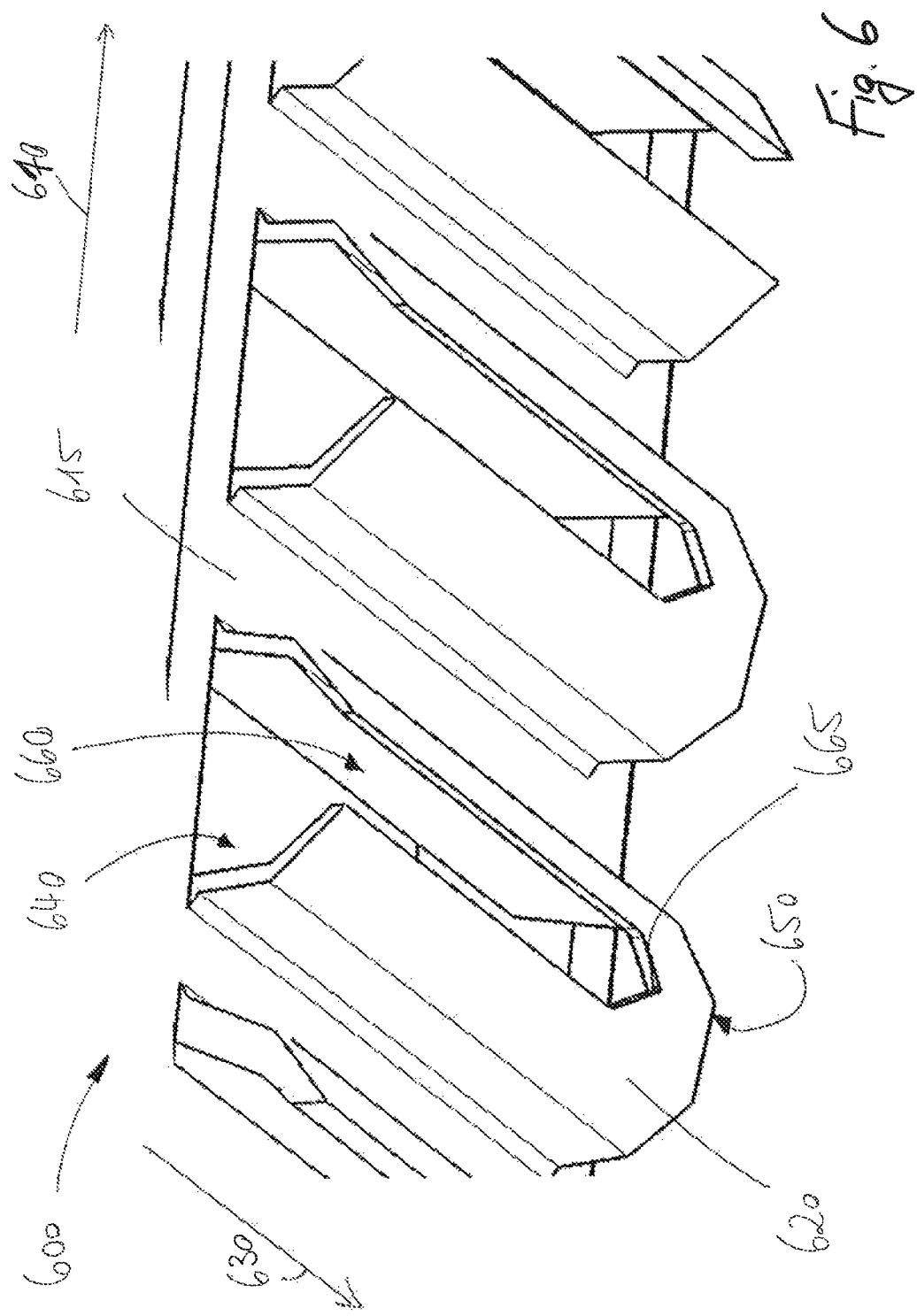

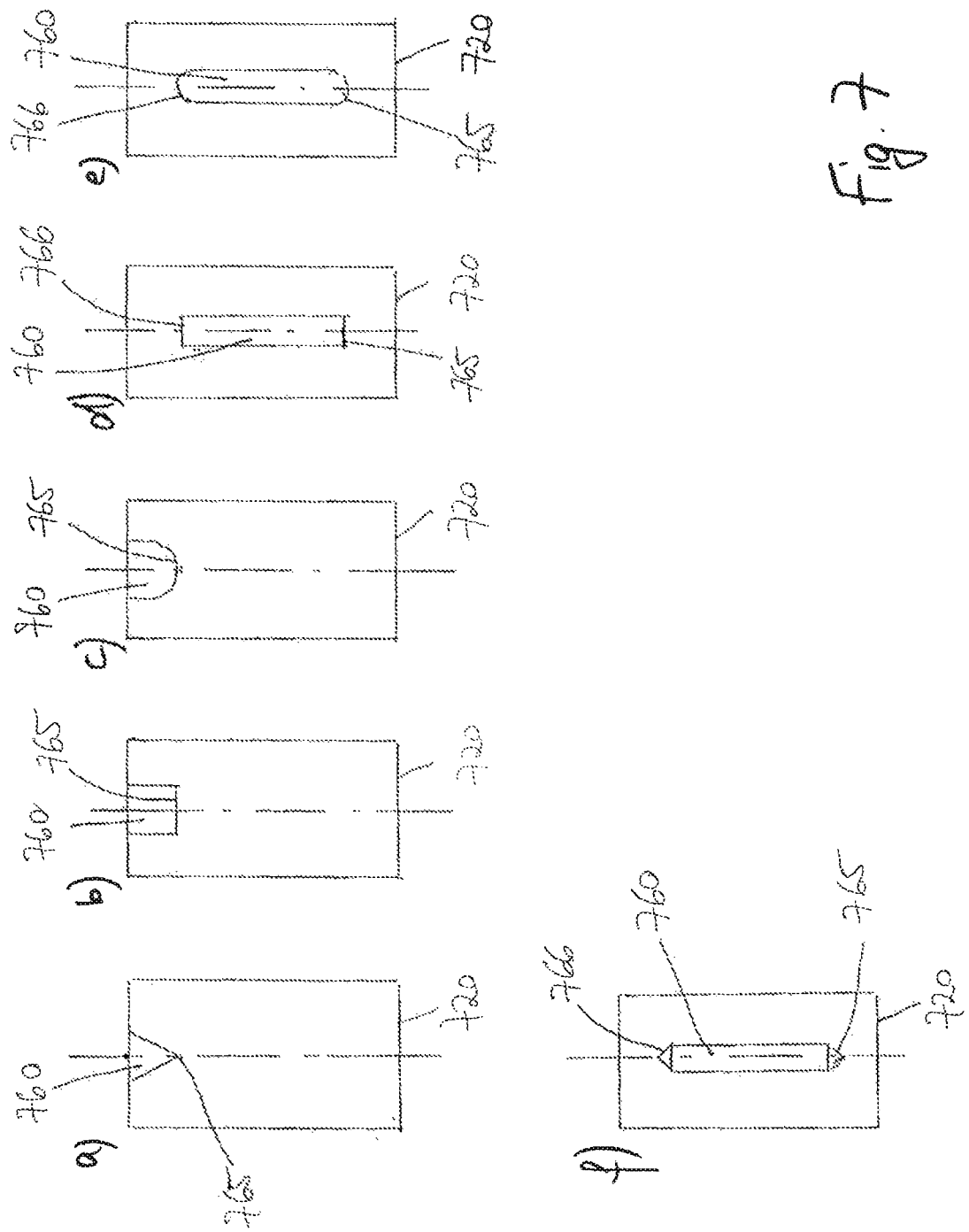

METHOD FOR THE PRODUCTION OF A STRIP FOR FASTENING ELEMENTS

FIELD OF THE INVENTION

The invention concerns a method for the production of a strip for fastening elements with a plurality of interconnected holding sections for the temporary holding of a fastening element.

BACKGROUND OF THE INVENTION

With such strips, the holding sections usually comprise a holder for a shaft or a head of the pertinent fastening element. During the driving of the fastening element into a support with the aid of a fastening device, the fastening element is pressed from the holder or through the holder, wherein a certain force is to be expended. If necessary, the holder is thereby destroyed, wherein, under certain circumstances, remains of the holder adhere to the fastening element.

For the production of such strips, a method is known for deforming a continuous strip in the later fastening direction in such a way that a holder is formed, into which the fastening element is likewise introduced in the fastening direction.

SUMMARY OF THE INVENTION

It is a goal of the invention to make available a method with which a strip for fastening elements can be produced quickly and favorably.

This goal is attained by a method for the production of a strip for fastening elements with a plurality of interconnected holders for a shaft of a fastening element, wherein the holders define a fastening direction, in which the fastening element can be driven by a fastening device from the holder into a support, wherein the method comprises the following steps:
 a) production of a continuous strip, which defines a longitudinal direction of the strip
 b) production of the holders from the material of the strip
 c) incorporation of the fastening elements into the holders.

wherein during step b, the holders are produced, by a deep-drawing process, transverse to the fastening direction. During the deep-drawing, therefore, a part of the strip material is drawn in a direction other than the fastening direction. The deep-drawing direction is thereby the direction in which the deep-drawing punch is moved, relative to the deep-drawing die. Preferably, the deep-drawing direction is perpendicular to the fastening direction. With particular preference, the deep-drawing direction is perpendicular to the longitudinal direction of the strip. By stretching the deep-drawn material, a material thickness of the holders can be selected independently of a material thickness of the continuous strip.

A preferred embodiment of the method is characterized in that during step b), the strip material that forms a holder leaves an opening in the strip. In accordance with a particularly preferred embodiment, a hole is produced in a longitudinal direction of the strip at the same level with a holder. In a likewise particularly preferred embodiment, a holder is produced between two openings in a longitudinal direction of the strip.

A preferred embodiment of the method is characterized in that the fastening element has a shaft, wherein during step c), the shaft is held in the holder. With particular preference, the fastening element also comprises a tip or a head. The fastening element is preferably provided with a thread and designed as a screw. In alternative embodiments, the fastening element is designed as a nail, bolt, or the like.

A preferred embodiment of the method is characterized in that during or after step b), the holders are provided with a slit. The slit preferably extends along the fastening direction. With particular preference, the slit is designed continuously on the holder. A preferred embodiment of the method is characterized in that during step c), the fastening elements are snapped into the holders. This is preferably carried out through the slit that may be present. With preferred alternative embodiments, the slit extends only over a part of the holder and is not formed continuously.

A preferred embodiment of the method is characterized in that during step c), the fastening elements are introduced into the holders in the fastening direction. With particular preference, the fastening elements are inserted into the holders.

A preferred embodiment of the method is characterized in that during or after step b), the holders are provided with a predetermined breaking point. Preferably, the predetermined breaking point extends along the fastening direction.

A preferred embodiment of the method is characterized in that the fastening element has a head on the end of the shaft, contrary to the fastening direction, and a funnel-shaped expansion section between the head and the shaft; its outside dimensions, transverse to the fastening direction, exceed the inside dimensions of the holder. With particular preference, the funnel-shaped expansion section is designed conically. Preferably, the holder can be expanded through the head or the expansion section—with particular preference, can be bent open—with a movement of the fastening element in the fastening direction.

BRIEF DESCRIPTION OF THE SEVERAL VIEWS OF THE DRAWING(S)

Figure 2:
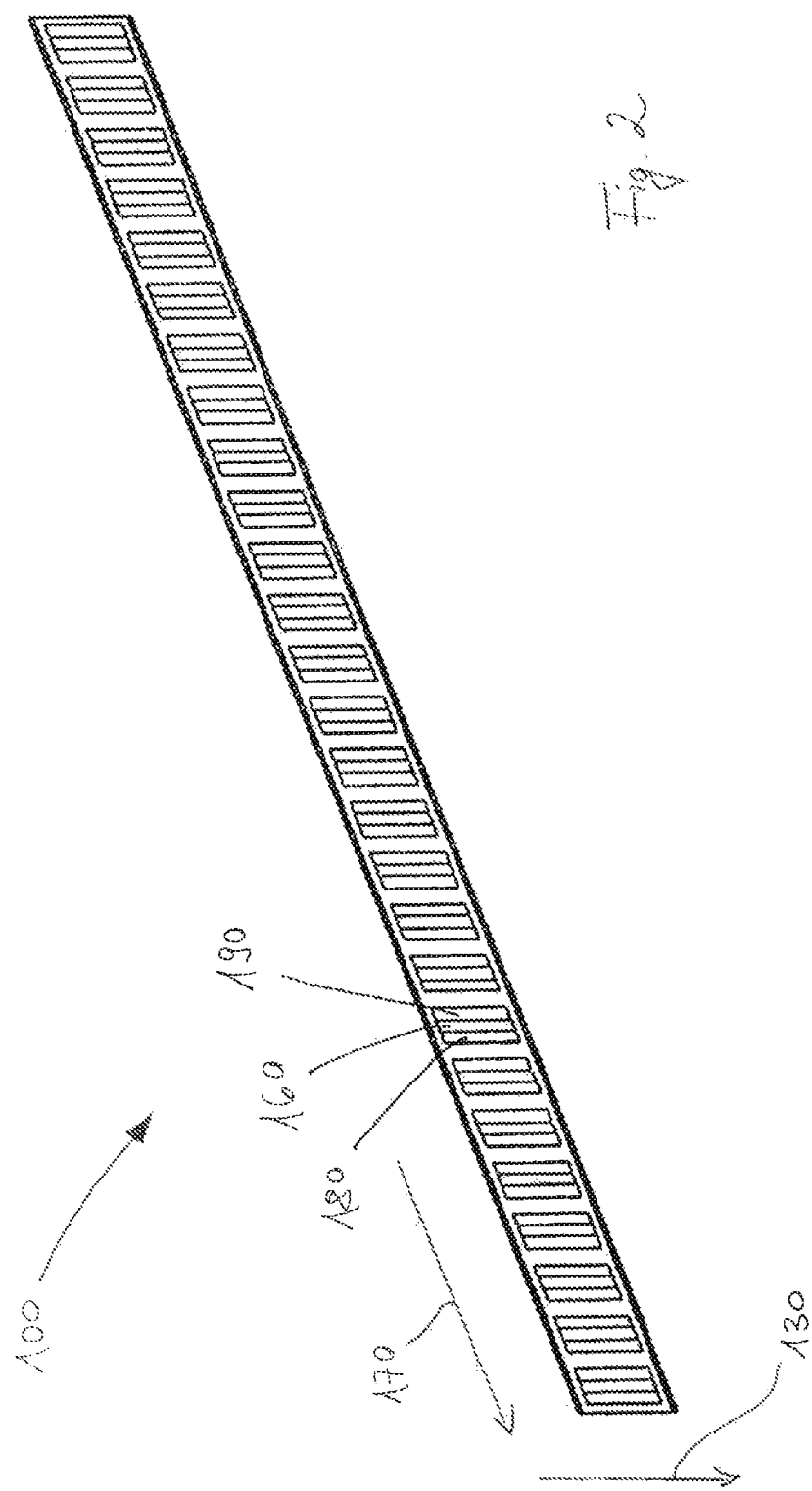

Below, preferred embodiment examples are explained in more detail, with reference to the drawings. The figures show the following:
 FIG. 1, a strip for fastening elements in an inclined view;
 FIG. 2, a strip for fastening elements in a side view;
 FIG. 3, a strip for fastening elements in a view in the fastening direction;
 FIG. 4, a strip for fastening elements in a view in the fastening direction;
 FIG. 5, a strip for fastening elements in a view in the fastening direction;
 FIG. 6, a strip for fastening elements in an inclined view; and
 FIG. 7, various holders for fastening elements in a schematic view.

DETAILED DESCRIPTION OF THE INVENTION

FIG. 1 shows an inclined view of a strip 100 for non-depicted fastening elements with a shaft and a head. The strip 100 is made of plastic and comprises a multiplicity of interconnected holders 120 for the temporary holding of a fastening element and connecting sections 115, situated between two holders. The fastening elements are thereby preferably held in a middle position, that is, with their center of gravity within a holder 120. In non-depicted embodiment examples, the strip is made of a metal foil or a paper strip.

Each holder 120 is provided for one shaft of a fastening element, which can be driven, in a fastening direction 130, from the holder 120 into a non-depicted support. The fastening direction 130 is thereby oriented perpendicular to a longitudinal direction 170 of the strip. The fastening element then bends open the holder 120, as a result of its movement, in the fastening direction 130 and, with a relatively low expenditure of force, snaps out of the holder 120. For this purpose, the fastening element has a head on the end of the shaft, contrary to the fastening direction, and a funnel-shaped expansion section between the head and the shaft; the outside dimensions of the expansion section, transverse to the fastening direction, exceed the inside dimensions of the holder.

The holder 120 has a slit 160, which extends continuously over the entire length of the holder 120, along the fastening direction 130, and a head-side front opening 140 and a tip-side front opening 150 of the holder 120 interconnect. The width of the slit 160 is smaller than a width of the holder 120, so that the non-depicted fastening element can be snapped through the slit 160 into the holder 120 and is held securely in the holder 120.

The holders 120 project, in a manner vertical to a strip plane, spanned by the fastening direction 130 and the longitudinal direction of the strip 170, from a continuous core of the strip 100. In this way, it is possible, in a simple manner, to form the strip 100, with a suitable selection and strength of the material, sufficiently rigid to guarantee a simple conducting of the strip 100 into a fastening device, without thereby dispensing with the flexibility of the holders 120, required for the separation of the fastening elements, which holders have a smaller material thickness than the core of the strip 100.

For the production of the strip 100, a continuous strip is first produced and from its material, the holders 120 are then produced. For each holder, subsequently, a rectangular region is drawn out from the continuous strip and against a counter-die, by means of a punch, perpendicular to the fastening direction 130 and perpendicular to the longitudinal direction 170 of the strip. The front openings 140, 150 are produced by a prior or simultaneous punching, for example, by correspondingly sharp edges of the punch. The rectangular region is formed, during the deep-drawing or thermoforming, to make up the support walls 180, 190 of the individual holder 120. The slit 160 is produced by a simultaneous or subsequent punching, for example, by a correspondingly sharp, front edge of the punch. The supporting walls 180 and 190 thereby leave behind an opening 200 in the strip 100, which is situated in the longitudinal direction of the strip 170 at the same level with the holder 120, since the supporting walls 180 and 190 of an opening 200 are designed bent toward one another and thus jointly form a holder 120.

FIG. 2 shows a side view of another strip 100 for non-depicted fastening elements with a shaft and a head. In contrast to the strip shown in FIG. 1, the fastening direction 130 and longitudinal direction of the strip are not vertical here, but rather oriented inclined to one another at an acute angle. The angle of inclination is, thereby, preferably between 45° and 80°, with particular preference 70°. Due to the arrangement of the fastening elements, which are thus in a staggered connection, their heads partially overlap, so that with the same length of the strip 100, more fastening elements are held on the strip.

FIG. 3 shows the strip 100 from FIG. 1 or 2, in a view in the fastening direction. The same reference symbols thereby stand for the same elements. In addition, a screw 110 is shown in cross section as the exemplary fastening element, which is held in one of the holders 120.

FIG. 4 shows a strip 400 in a cross-sectional view in the fastening direction, with a fastening element 410 that is held in a holder 420. In the production of the strip 400, supporting walls 480, 490 are produced by means of a punch; they leave behind an opening 499 in the strip 400. The supporting walls of the opening 499 are designed bent away from one another in such a way that the supporting wall 490 of the opening 499 forms, with a supporting wall 480' of an adjacent opening 499', the holder 420, wherein the holder has a continuous slit 460 in the fastening direction between the supporting walls 480, 490. In a longitudinal direction 470 of the strip 400, then, a holder 420 is situated between the openings 499, 499'.

FIG. 5 shows a strip 500 in a cross-sectional view, in the fastening direction, with a fastening element 510 that is held in a holder 520. In the production of the strip 500, the holders 520 are not slit; rather, one single supporting wall forming the holder 520 is produced by means of a punch, leaving behind an opening 599. The material for the holder is thereby drawn by means of the punch against a counter-die. The counter-die has a pointed edge for the production of a notch 525, which is preferably continuous in the fastening direction, which represents a predetermined breaking point, so as to facilitate the separation of the fastening element 510.

In non-depicted embodiment examples, the punch alternatively or additionally has a pointed edge, so that the predetermined breaking point is optionally formed by a notch on the outside of the holder, by a notch on the inside of the holder, or by a two-sided weakness of the material of the holder. With other non-depicted embodiment examples, the holders are provided, as an alternative to or in addition to a slit, with a predetermined breaking point.

FIG. 6 shows an inclined view of a strip 600 for non-depicted fastening elements. The strip 600 comprises a multiplicity of interconnected holders 620 for the temporary holding of a fastening element and connecting sections 615 situated between two holders 620. The fastening elements are preferably held in the middle, that is, with their center of gravity within a holder 620.

Each holder 620 is provided for a shaft of a fastening element, which can be driven, in a fastening direction 630, from the holder 620 into a non-depicted support. The fastening direction 630 is inclined, relative to a longitudinal direction 670 of the strip.

The holder 620 has a slit 660, which extends, proceeding from a head-side front opening 640, over a part of the holder 620, along the fastening direction 630 and ends before a tip-side front opening 650 of the holder 120. The end 665 of the slit 660 is thereby made to be pointed, so that the fastening element first bends open the holder 620 as a result of its movement in the fastening direction 630, and then tears it open, proceeding from the end 665, which is possible as a result of the notch effect, with a relative low expenditure of force.

FIG. 7 shows several alternatives of a slit 760 on a holder 720, wherein the alternatives differ mainly in the form of the end 765 of the slit 760. The form of the slit end 765 is pointed (FIG. 7*a*), planar (FIG. 7*b*), or rounded (FIG. 7*c*). In other embodiment forms, the slit 760 is not connected with any of the front openings of the holder 720, but rather has two ends 765, 766, which are planar (FIG. 7*d*), rounded (FIG. 7*e*), or pointed (FIG. 7*0*. The slit 760, in particular its end 765, serves under certain circumstances as the theoretical rupture site during the separation of a fastening element from the holder 720. In non-depicted embodiment examples, different forms of the two ends of a slit are combined with one another and/or the holder has several slits, for example, a slit in accordance with FIG. 7a and a slit in accordance with FIG. 7f.

In other non-depicted embodiment examples, the holder is provided with a predetermined breaking point in the form of an inside and/or outside notch, for example, as shown in FIG. 5, and with one or more slits, for example, as shown in FIGS. 7a and 7f. Preferably, the notch is thereby designed as a prolongation of the slit beyond its end and, with particular preference, extends to the tip-side front opening of the holder.

The invention under consideration was depicted as an example of a production method for a strip for fastening elements with a shaft and a head in particular, for a fastening device. It should be pointed out, however, that the method in accordance with the invention and the strip in accordance with the invention are also suitable for other application purposes.

The invention claimed is:

1. A method for the production of a continuous strip having a plurality of interconnected holders for temporarily holding fastening elements, each of the plurality of interconnected holders receiving a shaft of a fastening element, wherein each of the plurality of interconnected holders defines a fastening direction, in which a fastening element can be driven by a fastening device from each of the plurality of interconnected holders into a support, wherein the method comprises:
   a) producing the continuous strip, which defines a longitudinal direction of the continuous strip;
   b) producing, by a deep-drawing process, transverse to the fastening direction, the plurality of interconnected holders from a material of the continuous strip, including cutting out an opening in the material of the continuous strip, wherein the cut-out strip material forms one of the plurality of interconnected holders; and,
   c) incorporating a fastening element into each of the plurality of interconnected holders.

2. The method according to claim 1, wherein the deep-drawing process is perpendicular to the longitudinal direction of the continuous strip.

3. The method according to claim 2, including producing an opening on a level, in the longitudinal direction of the continuous strip, with one of the plurality of interconnected holders.

4. The method according to claim 2, including producing one of the plurality of interconnected holders, in the longitudinal direction of the continuous strip, between two openings.

5. The method according to claim 1, including during or after step b), providing one of the plurality of interconnected holders with a predetermined breaking point.

6. The method according to claim 5, including providing the predetermined breaking point extending along the fastening direction.

7. The method according to claim 5, wherein the one of the plurality of interconnected holders breaks at the predetermined breaking point when a fastening element incorporated into the one of the plurality of interconnected holders is driven from the one of the plurality of interconnected holders into the support.

8. The method according to claim 1, including during or after step b), providing one of the plurality of interconnected holders with a slit, which extends along the fastening direction.

9. The method according to claim 8, wherein the slit extends, in the fastening direction, throughout the one of the plurality of interconnected holders.

10. The method according to claim 9, including during step c), snapping a fastening element through the slit into the one of the plurality of interconnected holders.

11. The method according to claim 1, wherein the deep-drawing process is perpendicular to the fastening direction.

12. The method according to claim 11, wherein the deep-drawing process is perpendicular to the longitudinal direction of the strip.

13. The method according to claim 1, including during step c), introducing a fastening element into one of the plurality of interconnected holders in the fastening direction.

* * * * *